July 3, 1945.　　　G. A. LOWDEN　　　2,379,534
OPTICAL WORK AREA LOCATOR
Filed April 20, 1943　　　2 Sheets-Sheet 1

Gordon A. Lowden
Inventor

By *Earl Beust*
His Attorney

July 3, 1945.   G. A. LOWDEN   2,379,534
OPTICAL WORK AREA LOCATOR
Filed April 20, 1943   2 Sheets-Sheet 2

Gordon A. Lowden
Inventor
By *Carl Beust*
His Attorney

Patented July 3, 1945

2,379,534

UNITED STATES PATENT OFFICE 2,379,534

OPTICAL WORK AREA LOCATOR

Gordon A. Lowden, Miamisburg, Ohio

Application April 20, 1943, Serial No. 483,746

2 Claims. (Cl. 88—24)

This invention relates to an optical means to direct attention by spot light to particular work areas on record material, and more specifically pertains to such means for directing the attention to the same area on each of a plurality of similar record sheets or work lines as they are brought successively to a particular work location.

In accounting work, it is often necessary to examine a voluminous number of similar record sheets having thereon a confusing number of indicia, figures, or words, and to copy off therefrom the data contained on a particular area of each sheet, said areas having the same location on each sheet. It is also often necessary to bring successive work areas on the same sheet to a work position. Such work is done rapidly, and consequently, without some means of directing the worker's attention to the work area, much time and energy are lost in visually locating each successive work area.

Mechanical contrivances heretofore known to accomplish such area-locating have been faulty, inasmuch as such a mechanical contrivance and the record sheet are usually superimposed, thus necessitating the removal of the contrivance each time a new record sheet is brought to the work position. Other contrivances acting as line finders obscure part of the record material, preventing full view of contextual data.

Applicant, as an object of his invention, provides means to project a spot light pattern onto work positioned relatively to the projected rays, so that record material placed in the work position will be differentially lighted, either by degree or by color. By such means, the wanted work area may be visually chosen for attention by either the pattern of the light, the quantity of light, or the quality of light.

Another object of the invention is to provide optical projection slides having light-transmitting areas so that light may be projected on the work area of record material.

Another object of the invention is to provide optical projection slides having a plurality of light-transmitting areas with selected color filters over selected ones of the areas.

Another object of the invention is to provide a light-projecting device correlated with a record-holding device, so that any record placed on the work-holding device is differentially illuminated to point out the same work area on each record.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

Figure 3:
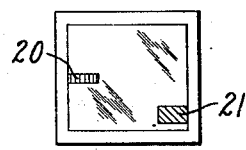
Figs. 3 and 4 represent typical projection slides.

The invention consists, in essence, of a source of light 10 (Fig. 1), which is collected by a condensing lens 11 and formed into a light pattern by a patterned transparent glass-like slide 12 and projected and focused, by a lens system such as that indicated schematically by the lenses 13, onto a work area such as that indicated by the vertical support board 14, which is supplied with positional rings 15, which are also fastened to a base 17, to receive punched tabular cards 18 so that they may be brought successively to or from the work area defined by the vertical board 14, before described. The slide 12 has apertures therein, such as, for instance, those numbered 20 and 21, through which the light from the light source is admitted, the remainder of said slide being opaque. Apertures 20 and 21 may, as shown in Fig. 3, be supplied with a color filter; for example, those shown in said Fig. 3 being red and green, so that the projected light, in colors or in white, is directed to certain selected areas, such as areas 23 and 24 (Fig. 1) shown on the record card supported against the back board.

The apertures in the slide are made to conform with the particular spacing on the record material and are made to conform in position to the particular area on the record material which is to be examined.

Figure 1:
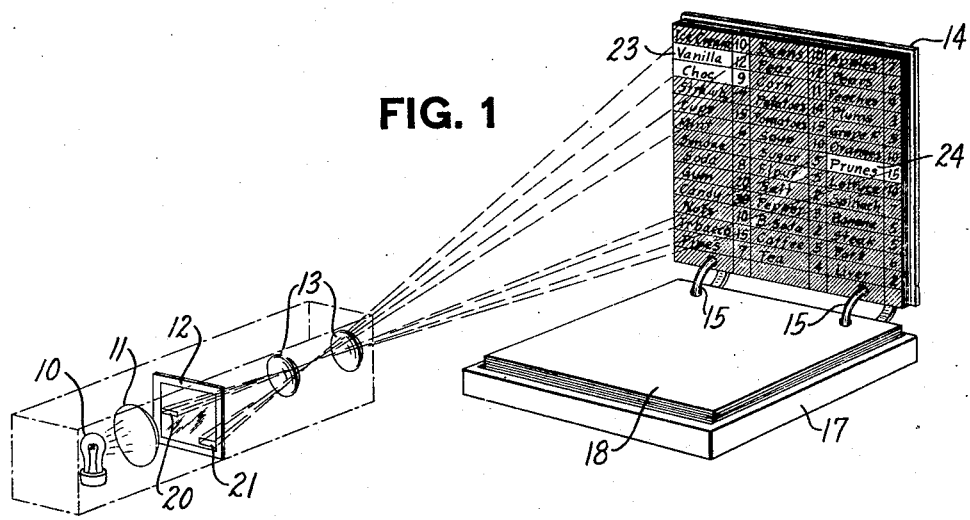
Fig. 1 represents an optical system for projecting a pattern of light onto a work area.
Figure 2:
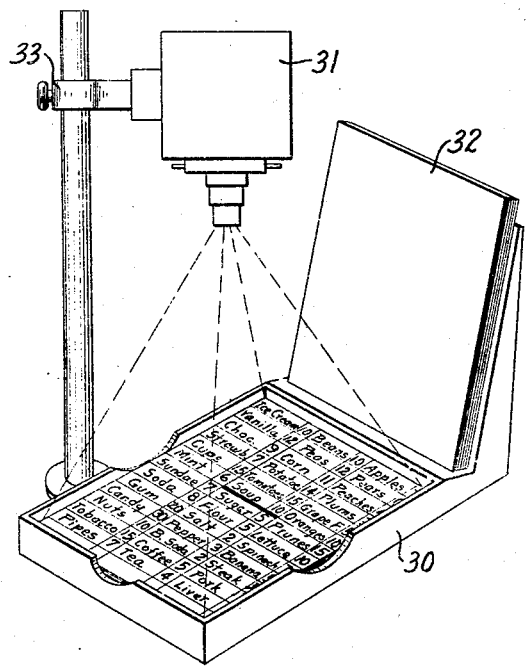
Fig. 2 represents an optical system such as that shown in Fig. 1 with means fixing the relative positions of the projector and the wo k area.

Although rings are shown in Fig. 1 as being the positioning means for locating the record material with relation to the projector, other forms may be used, one such form being shown in Fig. 2, in which a locating box 30, the size of the record material, is rigidly positioned with respect to the projector 31. The cards of the stack 32 are positioned in the box 30 successively, as desired. Adjustments such as adjustment 33 may be used to direct the light to whatever area it is desired to project the pattern.

Figure 4:
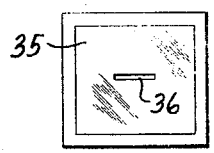

Fig. 4 shows a slide having a transparent portion 35 and an opaque portion 36, the effect of which is to underscore, with a relatively dark line, that particular area to which it is desired to bring attention, as shown in Fig. 2, the black line underscoring the particular item to which attention is to be drawn on the card.

Figure 5:
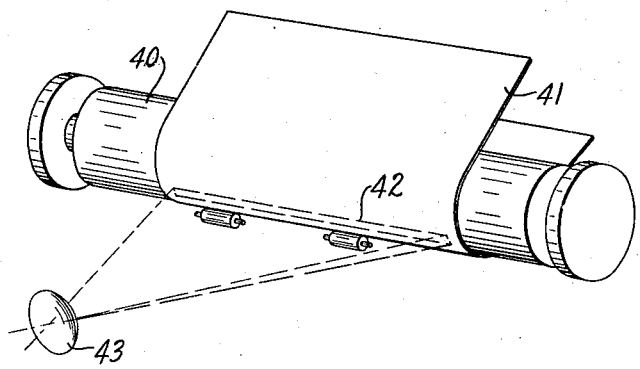
Fig. 5 represents the means to project a light pattern on a work sheet having areas brought to position line by line.

The invention is not deemed to be restricted to cards, as there is shown in Fig. 5 a means to illuminate a certain fixed portion of a work support such as a rotatable platen 40, supporting a flexible work sheet 41, upon which is cast a band of light 42 by means of a projector indicated by the lens 43, the projection system in detail not being illustrated. The slide used to obtain a band of light like band 42 may be like the slide shown in Fig. 4, with the area 35 being opaque and the area 36 being transparent. The work supporting platen 40 (Fig. 5) may be rotated so as to move the work sheet 41 with relation to the light band 42, so as to illuminate successive lines.

It is apparent that the record material may be delineated into areas by any means such as by printed lines, embossing, punchings, or folds, or the same effect may be secured by having the data placed on the records in patterns without having the areas otherwise delineated.

Figure 6:
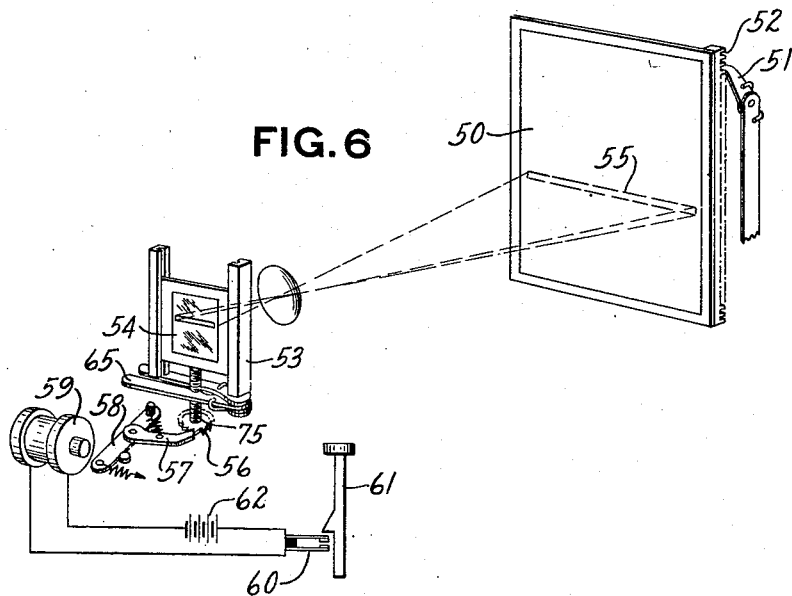
Fig. 6 represents means for moving a light projector and a work holder relatively, step by step.

In Fig. 6 is shown a form of the invention in which a work support 50 is positionable, with relation to a fixed light band 55, step by step by a pawl 51 engageable with a rack 52, said work support being positioned relatively to a slide frame 53, in which is a slide 54, patterned to cast a band of light onto the work support 50. This slide is movable relatively to the work support by means of a screw 75 turned by a ratchet 56 through a pawl 57 operated by a lever 58 through a power source including a solenoid 59 rendered energized by the closing of contacts 60 upon depression of key 61, which closes a circuit through a battery 62. By this means, the slide 54 can be moved step by step relatively to the work support, and provision is made for returning the slide to home position by opening lever 65, which contains the mating threads for the screw 75, allowing the slide to return to home position.

The invention has been shown to be applicable to examination of record material successively brought to viewing position piece by piece or line by line, the attention of the operator being directed to the work area by means of casting light on the record material so as to point out, by the pattern of the light, what is to be examined. The invention is not to be deemed restricted to those particular patterns shown in the slides, as it is obvious that any desired pattern or any number of elements in the pattern may be used; that any means may be utilized to position the record material with relation to the projector; and that the projection may be made by optical means other than that shown, such being presented merely for an example. It is also to be noted that the relative motion between the projector and the work material determines what successive lines on the work material are to be examined. Such relative motion may be made by moving either the record material, the light source, or the patterned slide, without departing from the principle of the invention.

While the form of the invention herein shown and described is admirably adapted to fulfill the objects primarily stated, it is to be understood that it is not intended to confine the invention to the embodiment herein disclosed, for it is susceptible of embodiment in various other forms all coming within the scope of the claims which follow.

What is claimed is:

1. In a spotlight device to aid visual examination of one or more out of a plurality of work fields on any of a plurality of similar records being examined, the combination of a plurality of like records each having a plurality of work fields defined thereon, each record having the fields arranged in the same conformation; a light beam projector including means for holding a light mask for controlling the beam; a record holder cooperable with each record held thereby to hold it in fixed relation to the projected light beam so as to intercept the light beam in the same place; and a light mask having selectively formed thereon light-transmitting fields and light-blocking fields correlated to the work fields on the records, said mask, when placed in the mask-holding means, permitting the light beam to fall only on those fields of a record held in the record holder that correspond to the light-transmitting fields of the mask.

2. The device of claim 1 wherein each of the light-transmitting fields of a mask passes a distinctively colored light.

GORDON A. LOWDEN.